Patented June 27, 1939

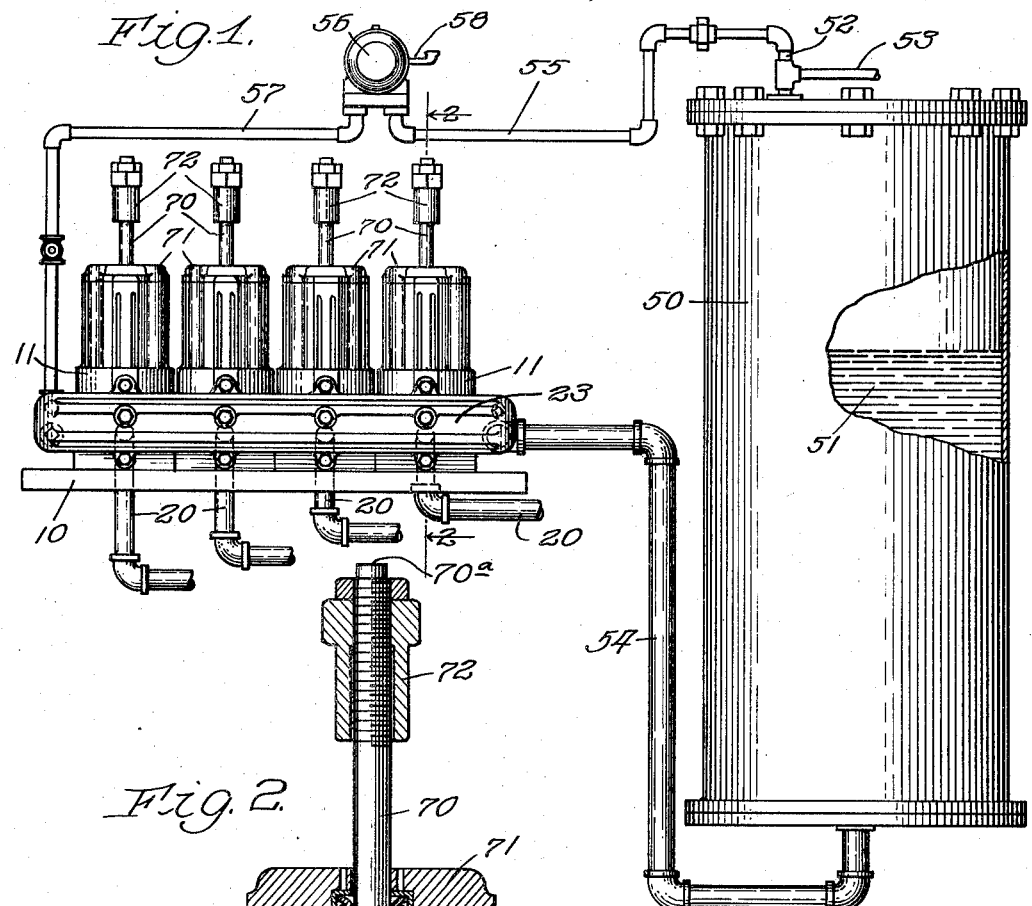
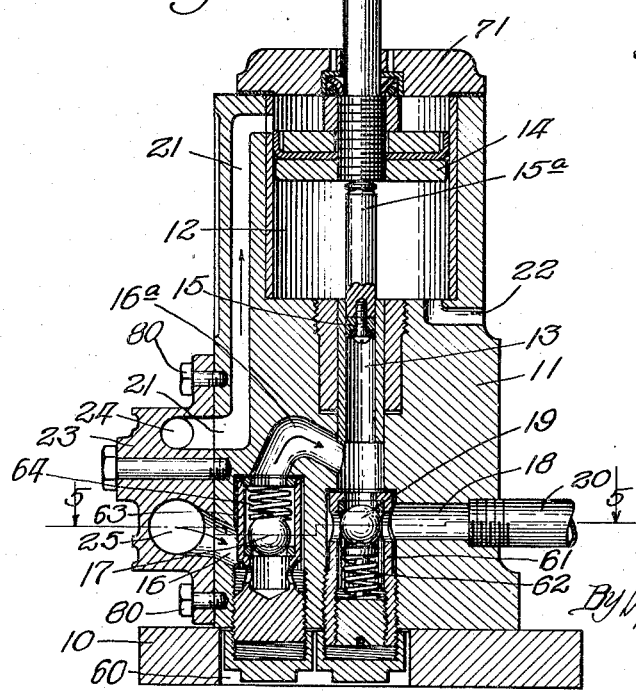

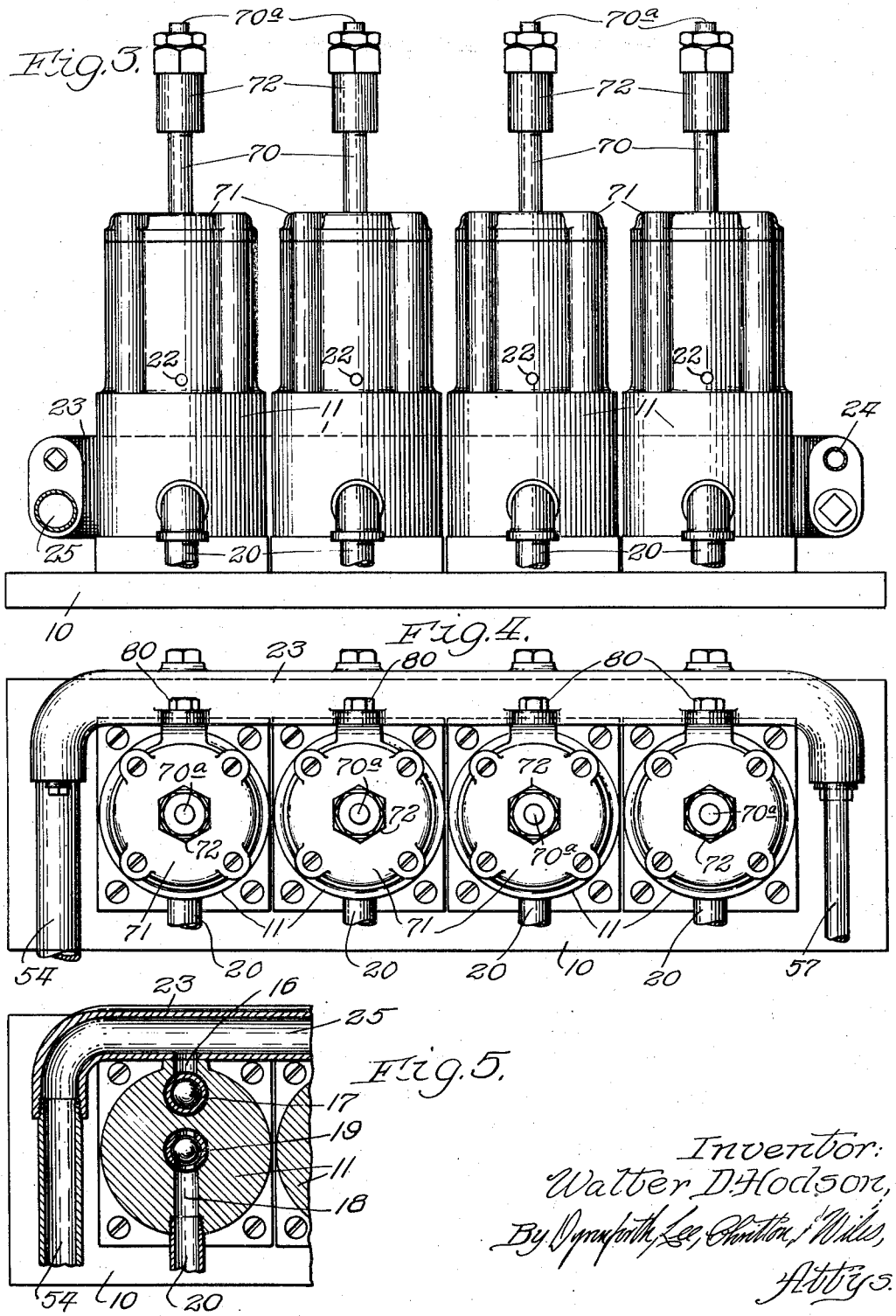

2,164,273

UNITED STATES PATENT OFFICE 2,164,273

MULTIPLE PRESSURE LUBRICATOR

Walter D. Hodson, Chicago, Ill., assignor to The Hodson Corporation, Chicago, Ill., a corporation of Delaware Application January 21, 1937, Serial No. 121,674

3 Claims. (Cl. 184—29)

This invention relates to improvements in lubricators and more especially a multiple pressure lubricator.

Among the features of my invention is the provision of such a device that is simple and efficient in construction and operation. My new device is so built that it can be easily and cheaply manufactured, and readily assembled. It is also so constructed that it can be repaired, cleaned and serviced, with a minimum of time and labor. The check valves in the improved apparatus are readily accessible for removal, replacement or cleaning.

Other features and advantages will appear more fully as I proceed with my specification.

In that form of device embodying the features of my invention shown in the accompanying drawings—Fig. 1 is a view in front elevation; Fig. 2 is a view taken as indicated by the line 2 of Fig. 1; Fig. 3 is an enlarged view in rear elevation of the cylinders; Fig. 4 is a similar view in top plan; and Fig. 5 is a view taken as indicated by the line 5 of Fig. 2.

As shown in the drawings, the lubricator includes a base 10 with a plurality of cylinders 11 mounted thereon. As here shown, there are four cylinders, although it is obvious that there may be more or fewer.

Since the construction and operation of each cylinder is substantially the same I shall describe but one in detail. As shown in Fig. 2 the cylinder has a large bore 12 at the upper end and a small bore 13 below the large bore. 14 indicates a large piston in the large bore, and 15 a small piston in the small bore. Means are provided whereby downward movement of the large piston forces the small piston downwardly. In the present instance this includes an elongation, extension, or upwardly projecting piston rod 15a, the upper end of which is engaged by the piston 14 when it moves downwardly to force the small piston 15 downwardly.

16 indicates a grease inlet connected to the lower end of the small bore by the conduit 16a. This passage is controlled by a spring pressed ball check valve 17 to permit passage of grease into the small bore but not in a reverse direction. 18 indicates a grease outlet connected to the lower end of the small bore controlled by another spring pressed ball check valve 19 to permit flow of grease from the small bore into the outlet pipe 20 but not in a reverse direction.

21 indicates an air inlet connected to the upper end of the large bore, and 22 a vent to atmosphere connected to the lower end of the large bore. 23 indicates a manifold attached to all the cylinders and provided with an air conduit 24 connecting the air inlets 21 and a grease conduit 25 connecting the grease inlet 16.

Means are provided for intermittently supplying air under pressure to the air conduit 24 in the manifold and venting the same to atmosphere. Means are also provided for supplying grease under pressure to the grease conduit 25 in the manifold. The pipes 20, 20 lead to the bearings or other members to be supplied with grease or other lubricant. In the operation of the device when air is supplied under pressure to the conduit 24 it enters the air inlets 21 above the pistons 14 to depress them to force grease from the small bores out through the outlet pipes 20 to the bearings. When the conduit 24 is vented to atmosphere grease under pressure from the conduit 25 enters the small bores 13 through the passages 16, 16a again to fill the small bores and raise the small pistons 15.

Any suitable means may be provided for supplying air and grease under pressure. For example, as here shown, the tank 50 may be partially filled with grease 51. Above the grease air is supplied under pressure through the pipe 52. Pipe 53 connects to any suitable means (not shown) for supplying air under pressure to the apparatus. Grease is fed from the tank 50 through the pipe 54 to the grease conduit 25 in the manifold.

Pipe 55 conducts air under pressure to the unit 56 which includes an intermittently operated three-way valve. Since the details of this unit form no part of the present invention, the same need not be described in particular. It will suffice to say that the unit 56 may be operated by electricity, clock work, or other suitable power, and comprises primarily a three-way valve adapted intermittently to connect the air pressure pipe 55 with the air pressure pipe 57 leading to the air conduit 24 in the manifold. Pressure is thus intermittently supplied to the upper ends of all the cylinders. After pressure has been thus applied a predetermined length of time the unit 56 operates to connect the pipe 57 with the vent pipe 58 leading to atmosphere to vent the large bores above the pistons 14. When this venting occurs grease is again supplied to the small bores to raise both pistons as described above.

The base 10 is provided with openings 60 to give access to the check valves 17 and 19. These check valves may be removed in complete units through the openings in the base. The small bore 13 is extended downwardly entirely through the cylinder and somewhat enlarged at the bottom to provide a housing for the removable cage 61 holding the ball check 19 and its spring 62. The cylinder 11 is provided with a chamber in its lower end intersecting the passages 16 and 16a, this chamber also registering with the opening 60 in the base. This chamber contains the cage 63 holding the ball check 17 and its spring 64. The entire cage 63 is removable as a unit from the cylinder through the opening 60 in the base. Likewise the entire cage 61 is removable through the opening 60 in the base.

Suitable packing is provided where required.

It is to be noted also that each cylinder has a bore extending entirely through the same, this bore at the upper end being enlarged to form the large bore 12. Below this is the small bore 13. Below the small bore 13 the opening is continued straight down entirely through the cylinder. The lower part of the opening is somewhat enlarged to form a chamber for the removable cage 61 holding the check valve 19. By this construction cleaning and repair are greatly facilitated. For example, the head 71 of a cylinder can be removed and both pistons taken out of the top. The check valve unit at the bottom can then be removed to give an opening straight through the entire cylinder. By this construction any clogging that might occur in the lower end of the small bore or in or about the check valve 19 can very easily be rodded out from the top or bottom. It is also a great advantage to have the check valve 19 directly below and in line with the small bore 13. If there is any clogging in the small bore 13 the check valve 19 with its cage 61 can be entirely removed from the cylinder and this will aid in removing the clogging out of the bottom of the cylinder. This can be done by pressure from above and may be assisted by rodding or hooking from below.

The manifold 23 is attached to the cylinders by the screws 80 so that it may easily be removed and when so removed, convenient access is afforded to air inlets 21 and the grease inlets 16 for cleaning and repair purposes.

It is to be noted that the air and grease supply lines connect to the manifold on either end. The grease lines are attached to the back of the valves, thus providing an independent direct line to each lubrication point at the pressure necessary to deliver the grease. For example, pressures ranging from 100 pounds up to 3500 pounds per square inch may be furnished if needed. The power for operating the multiple lubricator may be obtained from any suitable source. For example, in a large plant there is ordinarily air pressure available. It has been found in practice that 100 pounds air pressure is suitable for operating the system. By employing a 35-to-1 ratio between the air cylinder and the grease piston, with 100 pounds of air, 3500 pounds of pressure per square inch may be obtained in the grease lines.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A multiple lubricator, including a base, a plurality of cylinders supported on said base, each cylinder having a large bore at its upper end and a bore below and in line with the large bore, relatively small in cross section to materially increase the ratio of pressure, a large piston in the large bore, a small piston in the lower bore to be forced downwardly by the downward movement of the large piston, a removable closure for the large bore, said pistons being removable upwardly through the large bore, a grease inlet laterally connected to the lower end of the small bore, a check valve in said inlet, a grease outlet connected to the lower end of the small bore, a check valve in said grease outlet, each cylinder having an air inlet passage in its wall open at the upper end of the large bore, a removable manifold above said base at one side of the cylinders having an air conduit connecting the air inlets and having a grease conduit connecting the grease inlets, said base being open in line with the said valves, means mounting said valves for removal downwardly through said base, means for supplying grease under pressure to said grease conduit, and means for intermittently supplying air under pressure from the same source as the air pressure supplied for the grease to the air conduit and then venting the same to atmosphere.

2. A multiple lubricator, including a base, a plurality of cylinders supported on said base, each cylinder having a large bore at its upper end and a bore below and in line with the large bore, relatively small in cross section to materially increase the ratio of pressure, a large piston in the large bore, a small piston in the lower bore to be forced downwardly by the downward movement of the large piston, a removable closure for the large bore, said pistons being removable upwardly through the large bore, a grease inlet laterally connected to the lower end of the small bore, a check valve in said inlet, a grease outlet connected to the lower end of the small bore, a check valve in said grease outlet, each cylinder having an air inlet passage in its wall open at the upper end of the large bore, a removable manifold above said base at one side of the cylinders having an air conduit connecting the air inlets and having a grease conduit connecting the grease inlets, said base having openings in line with the said valves, said outlet valves comprising cages and valve members contained therein, means removably mounting said cages and valve members for unitary downward removal through said openings, means for supplying grease under pressure to the grease conduit connected to one end of the manifold, and means for intermittently supplying air under pressure to the air conduit at the other end of the manifold and then venting the same to atmosphere.

3. A lubricator including a base, a cylinder on said base, said cylinder having a large bore at its upper end, a bore below and in line with the large bore relatively small in cross section to materially increase the ratio of pressure, fastening members removably securing the cylinder to said base, a large piston in the large bore, a small piston in the small bore, to be forced downwardly by downward movement of the large piston, a removable closure for the large bore, said pistons being removable upwardly through the large bore, a grease inlet laterally connected to the lower end of the small bore, a check valve in said inlet, a grease outlet connected to the lower end of the small bore, a check valve in said grease outlet, said cylinder having an air inlet passage in its wall open at the upper end of the large bore, a manifold above said base removably connected to one side of said cylinder, said manifold having an air conduit connecting the air inlet and a grease conduit connecting the grease inlet, said base having an opening in line with said second check valve, a cage connecting said second check valve, said cage and second check valve being unitarily downwardly removable through said opening, means for supplying grease under pressure to the grease conduit, and means for intermittently supplying air under pressure to the air conduit and then venting same to atmosphere.

WALTER D. HODSON.